(12) United States Patent
Peoples

(10) Patent No.: US 9,565,851 B2
(45) Date of Patent: Feb. 14, 2017

(54) REMOTE ROBOTIC CAN CALL SYSTEM

(71) Applicant: Paul Peoples, Ardmore, AL (US)

(72) Inventor: Paul Peoples, Ardmore, AL (US)

(*) Notice: Subject to any disclaimer, the term of this patent is extended or adjusted under 35 U.S.C. 154(b) by 0 days.

(21) Appl. No.: 14/848,686

(22) Filed: Sep. 9, 2015

(65) Prior Publication Data

US 2016/0227758 A1  Aug. 11, 2016

Related U.S. Application Data

(60) Provisional application No. 62/114,681, filed on Feb. 11, 2015, provisional application No. 62/114,686, filed on Feb. 11, 2015.

(51) Int. Cl.
*A01M 31/00* (2006.01)
*A01M 31/06* (2006.01)

(52) U.S. Cl.
CPC .......... *A01M 31/004* (2013.01); *A01M 31/06* (2013.01)

(58) Field of Classification Search
CPC .................. A01M 31/004; A01M 31/06
USPC .......................... 446/397; 43/1, 2
See application file for complete search history.

(56) References Cited

U.S. PATENT DOCUMENTS

| | | | |
|---|---|---|---|
| 4,773,178 A * | 9/1988 | Marek ............... | A01M 31/06 43/1 |
| 4,862,625 A * | 9/1989 | Dolan ............... | A01M 31/004 43/1 |
| 4,888,903 A | 12/1989 | Knight et al. | |
| 5,233,780 A * | 8/1993 | Overholt ............ | A01M 31/06 43/2 |
| 5,402,102 A * | 3/1995 | Lachance ........... | A01M 31/004 340/384.1 |
| 5,431,590 A * | 7/1995 | Abbas ............... | F41B 5/14 124/90 |
| 5,555,664 A * | 9/1996 | Shockley ........... | A01M 31/06 43/1 |
| 5,563,574 A * | 10/1996 | Hoover ............. | G08B 1/08 340/384.4 |
| 5,572,592 A * | 11/1996 | Muckelrath ........ | H04R 27/00 340/12.5 |
| 5,791,081 A * | 8/1998 | Turner .............. | A01M 31/06 43/2 |
| 5,802,197 A * | 9/1998 | Fulcher ............. | H04R 1/021 381/386 |
| 5,964,054 A * | 10/1999 | Galfidi, Jr. ......... | G10K 9/04 42/90 |
| 5,975,978 A | 11/1999 | Hall | |
| 6,003,261 A * | 12/1999 | French .............. | A01M 31/04 43/1 |
| 6,053,793 A * | 4/2000 | Green ............... | A01M 31/004 446/188 |
| 6,053,794 A | 4/2000 | Weiser | |
| 6,120,341 A | 9/2000 | Hafford | |
| 6,213,295 B1 * | 4/2001 | Hohn ................ | A01M 31/004 206/315.1 |
| 6,289,626 B1 * | 9/2001 | Williams ........... | A01M 31/06 43/1 |
| 6,414,906 B1 * | 7/2002 | Gaspari ............. | A01M 31/004 340/384.7 |

(Continued)

*Primary Examiner* — Alexander Niconovich
(74) *Attorney, Agent, or Firm* — Cynthia R. Wright

(57) ABSTRACT

The present invention relates to a holder for an animal can call used for hunting. A can call is positioned about the device so that when a user activates a remote control, the holder inverts the can call producing a noise that attracts game animals.

6 Claims, 7 Drawing Sheets

(56) References Cited

U.S. PATENT DOCUMENTS

| | | | |
|---|---|---|---|
| 6,532,693 B2* | 3/2003 | Sides | A01M 31/06 43/2 |
| 6,575,804 B1 | 6/2003 | Primos | |
| 6,755,714 B1* | 6/2004 | Huddleston | A01M 31/004 446/207 |
| 6,901,693 B1* | 6/2005 | Crowe | A01M 31/06 43/2 |
| 6,902,463 B2 | 6/2005 | Vaicunas et al. | |
| 7,086,193 B1* | 8/2006 | Hurst | A01M 31/06 43/2 |
| 7,785,166 B1* | 8/2010 | Kirby | A01M 31/004 446/176 |
| 7,826,804 B1* | 11/2010 | Wright | A01M 31/004 119/720 |
| 7,878,879 B2* | 2/2011 | Simone | A01M 31/004 446/397 |
| 7,927,172 B1* | 4/2011 | Kirby | A01M 31/004 224/148.7 |
| 8,051,598 B2* | 11/2011 | Stillwell | A01M 31/06 43/2 |
| 8,250,801 B2* | 8/2012 | Elpi | A01M 31/06 43/2 |
| 2,602,834 A1 | 12/2013 | Natale | |
| 8,893,425 B2* | 11/2014 | Tanner | A01M 31/06 43/2 |
| 9,042,204 B2* | 5/2015 | Barley | A01M 31/004 367/197 |
| 9,144,234 B1* | 9/2015 | Elliott | A01M 31/004 |
| 9,265,245 B2* | 2/2016 | Marsh | A01M 31/06 |
| 2002/0061703 A1* | 5/2002 | Greenwaldt | A01M 31/004 446/202 |
| 2003/0093169 A1* | 5/2003 | Gardner | A01M 31/004 700/94 |
| 2006/0246815 A1 | 11/2006 | Simone | |
| 2007/0155282 A1 | 7/2007 | De Sousa | |
| 2008/0274666 A1 | 11/2008 | Weider | |
| 2012/0040648 A1* | 2/2012 | Sceery | A01M 31/004 455/414.1 |
| 2013/0326926 A1* | 12/2013 | Everington | A01M 31/06 43/2 |
| 2015/0015361 A1* | 1/2015 | Sceery | G06Q 40/00 340/4.42 |
| 2015/0031267 A1* | 1/2015 | Barrette | A01M 31/004 446/202 |
| 2016/0242407 A1* | 8/2016 | Franklin | A01M 31/004 |

* cited by examiner

REMOTE ROBOTIC CAN CALL SYSTEM

CROSS-REFERENCE TO RELATED APPLICATIONS

This application claims priority to U.S. Provisional Patent Application Nos. 62/114,681 and 62/114,686, both of which were filed on Feb. 11, 2015, the contents of both of which are expressly incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

STATEMENT REGARDING PRIOR DISCLOSURES BY THE INVENTOR OR JOINT INVENTORS

The inventor did not disclose the invention herein prior to the 12-month period preceding the filing of his provisional application.

BACKGROUND OF THE INVENTION (1) Field of the Invention

The present invention relates generally to a game call holder and more particularly to a game call holder that allows the remote operation of the game call. This invention allows a hunter to both position the game call away from his physical location and to operate the game call while keeping his hands free for other task.

(2) Description of Related Art

Numerous devices are known in the relevant art for use by hunters and others for producing game and/or predator calls and sounds in order to attract game, such as moose, elk, deer, waterfowl and wild turkey. These devices are known as game and/or predator calls and are widely commercially available. Many of these devices require a hunter to physically manipulate the position of the call or to manipulate the call itself.

Can-shaped calls are often used to attract deer and other game. Nick Natale (U.S. Pat. No. 8,602,834 B2) discloses a cylindrical, can-shaped can call that produces a game-attracting sound when the call is rotated from an upright position to an inverted position. The can call must be rotated 180° back to its upright position before being rotated upside down to repeat the call noise. A number of deer can calls are sold commercially, including but not limited to, Primos® "THE Original CAN" estrus bleat can call, Primos® "THE Lil' CAN" beat can call, and HUNTER'S SPECIALTIES'® adult doe estrus beat can call. Each of these can calls require a hunter holding the can call to manually rotate the call from an upright position to an inverted position to produce the game-attracting sound and to manually rotate the call from an inverted position to an upright position before repeating the call noise. A hunter must have at least one hand free from his or her weapon to manipulate a can call. It is preferred to have both hands positioned on a firearm when shooting. And, a bow and arrow requires a hunter to utilize both hands. The movement of a hunter's hands and weapon may be detected by the game being hunted. Often a hunter will have seconds to react to the appearance of game. If the hunter has his or her hands busy rotating a can call, he or she may miss a shot. Several devices have been disclosed that secure a can call to assist a hunter in manually inverting the call.

Kirby et al. (U.S. Pat. No. 7,927,172 B1) discloses a pair of jaws composed of spring material that clamp onto a can call. The device of Kirby also includes a fastener for attaching the device to a structure such as a tree or a deer stand. But, Kirby requires that a hunter remove at least one hand from his weapon to manipulate the can call. Brad Ray Weider (US 2008/2074666 A1) discloses a game call holder wherein the game call is secured into a holder and the holder is attached to the hand, arm, or wrist of a user. The device of Weider requires a user to rotate his or her arm to invert the can call that is strapped via the device to their hand, arm, or wrist. The rotation of a hunter's arm is likely to interfere with his or her ability to grip a weapon with two hands. And, the rotation of a hunter's arm is likely to be detected by game. Hands-free operation of a can call will prevent unnecessary hunter motion, allowing the hunter or user to maintain his or her weapon safely. And, hands-free operation of a can call is likely to be detected by game animals and/or predators increasing the likelihood of a successful hunt.

Bernardino De Sousa (US 2007/0155282 A1) discloses an animal call rotating device that is secured to a hunting stand, frame, shelter to other device. The hunter secures the can call into a holder connected to a shaft. The user pushes down on a pedal with his or her foot causing the shaft to move, which in turn, causes the can call to be inverted producing the animal-attracting noise. Although this device allows a hunter to manipulate a can call hands-free, the hunter desirous of using the call may be in a crouched position unable to manipulate a foot pedal.

Anthony Simone (US 2006/0246815 A1) discloses a motorized device that includes a can call attached to a rotatable shaft. The rotatable shaft is attached to a electrically-powered motor. The device is attached to a bow or to the stock of a gun so that the on/off switch is reachable to the hunter. When the on/off switch is positioned in the "on" position, the shaft rotates, inverting the can call causing animal noise to be emitted. While this device allows a hunter to maintain both hands on a weapon, the hunter is required to move at least one hand along the weapon to activate the on/off switch.

Each of the fore-mentioned devices requires a can call to be positioned proximal to the hunter or user. If a hunter is positioned in a tree stand, then deer beneath may recognize that the animal noise is coming from a source located within the tree canopy and not respond to the can call sound. Game animals, especially mature bucks and toms, have a keen sense of smell and are able to ascertain the location of a hunter. Game will not respond to an animal call if the call originates from a source that is proximate to a hunter's smell. A device that can remotely operate a can call would allow the hunter to position himself upwind of the animal noise produced so that the game animal is lured into the kill zone.

Electronic calls effectively simulate game noises but are illegal in most states. Can game calls that produce animal noises when inverted are permitted throughout the United States. While can calls can reliably produce game noises, they require the hunter to manipulate the call while maintaining control of a weapon. A hunter distracted by manipulating a can all may accidentally misfire. And, game animals may not respond to a call when the hunter's movement is detectable. Another disadvantage associated with each of game call devices is that the game/predator call originates from the hunter's location, which attracts the game/predator to the hunter which permits the game/predator to identify the hunter and avoid the call. This invention permits the remote operation of the can call so that the game/predator does not associate the call with the hunter and, therefore, improves the performance of the can call.

DETAILED DESCRIPTION OF THE INVENTION

Figure 1:
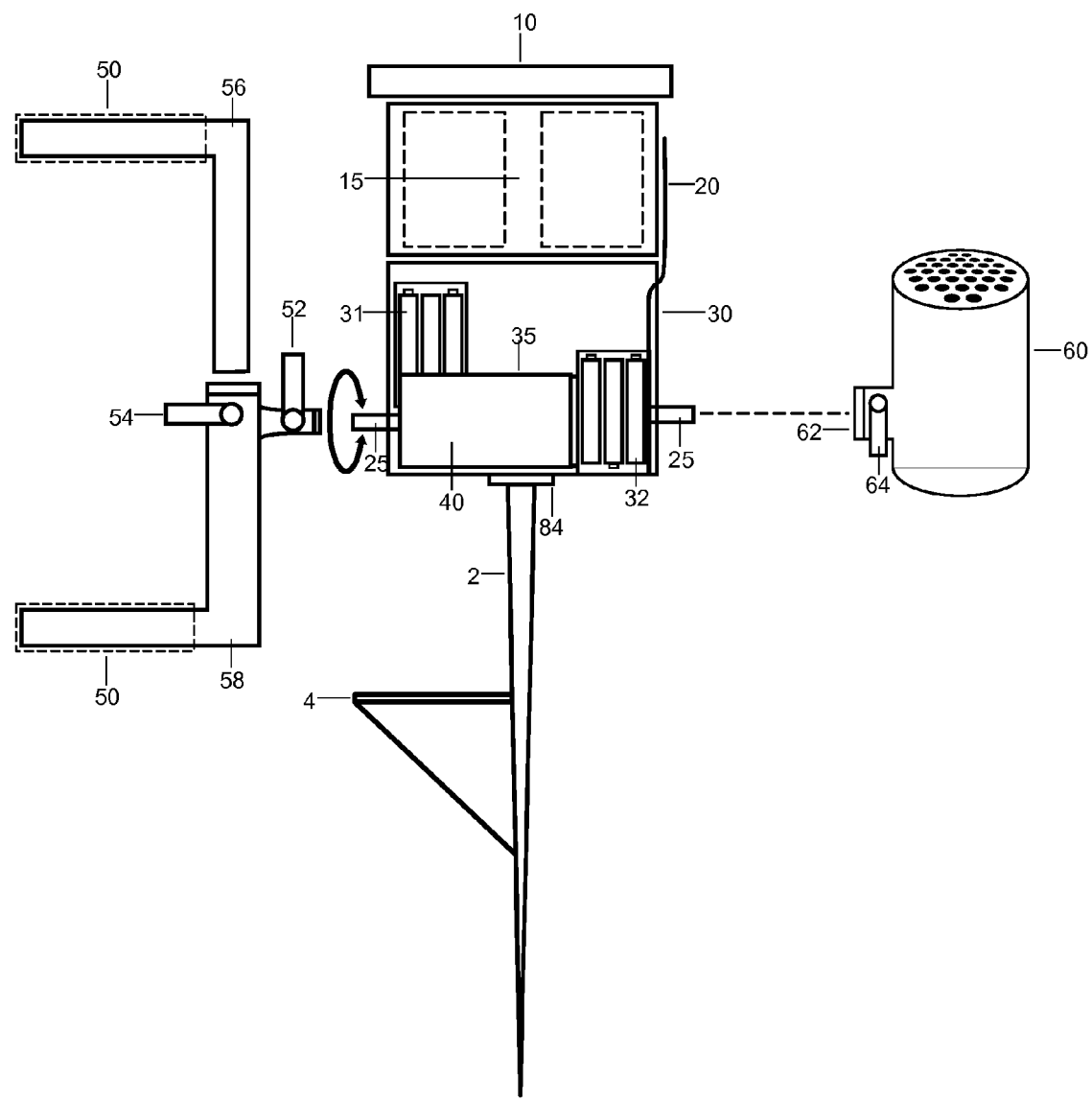
FIG. 1 illustrates the Remote Robotic Can Call system with a detachable gripping arm and a deer can call.

The present invention comprises, in one form thereof, a can game call holder configured to tightly hold a can call that emits a game noise/call when inverted. The holder is coupled to a motor energized by a battery source that inverts said can call from a right-side-up to a upside-down position and vice versa producing the game/predator call. The motor is operated by a remote control device that allows the holder to be staked at a distance from the hunter and safely operated with a click of the remote. Advantages of this invention include a hunter's ability to operate the game call without changing his or her firing position, the device herein can be used to operated a variety of can calls manufactured by different companies, and the device permits a can call to be consistently produce the desired animal noise, the device allows the can call to be placed at a location away from the hunter allowing the hunter to position is a tree or other location and call the game/predator to a location on the ground that is within his line of sight.

An advantage of this invention is that the placement of the present invention away from the hunter prevents the game from detecting the presence of the hunter. This invention allows the game/predator to be attracted to the can call and not the hunter.

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, et., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a ter; the scope and meaning of a term is the same, in the same context, whether or not it is highlighted. It will be appreciated that the same thing can be said in more than one way.

Consequently, alternative language and synonyms may be used for any ne or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified ter. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

FIG. 1 illustrates the Remote Robotic Can Call system (10, 15, 20, 25, 30, 31, 35, 40) with a stake (2 and 4) and both a detachable gripping arm (50, 52, 54, 56, and 58) and a can deer call (60).

The Remote Robotic Can Call system comprises a motorized compartment 30 with two arms 25 on opposing sides of the motorized compartment 30, an antenna 20 that receives a signal produced from remote control 100, a scent well 15 to hold scent to attract deer, a lid 10 to contain the deer scent within the scent well 15, a stake 2 and 4 to allow the insertion of the present invention into the ground. Additionally, the Remote Robotic Can Call system is operated by a remote control device that is utilized by the hunter to remotely activate at least one of the arms 25 of the present invention thereby inverting at least one can call producing deer call.

The Remote Robotic Can Call system allows for the attachment of commercially available can deer calls as well as custom can calls. FIG. 1 illustrates the attachment of both a commercially available can call via the gripping arm (50, 52, 54, 56, and 58). Additionally, FIG. 1 illustrates how a specially adapted can call (60, 62, and 64) can be attached to the Remote Robotic Can Call system via arm 25. The detachable gripping arm comprises two gripping means (56 and 58) that contain gripping pads 50 to securely hold a commercially available can deer call such as "The Original Can" Estrus™ can call sold by Primos® Hunting. 56 and 58 can be adjusted to accommodate can calls of varying sizes. 56 and 58 are locked into position via the locking mechanism 54. The gripping arm locks onto the Deer Killer Buddy System via locking mechanism 52 which clamps onto arm 25.

Figure 2:
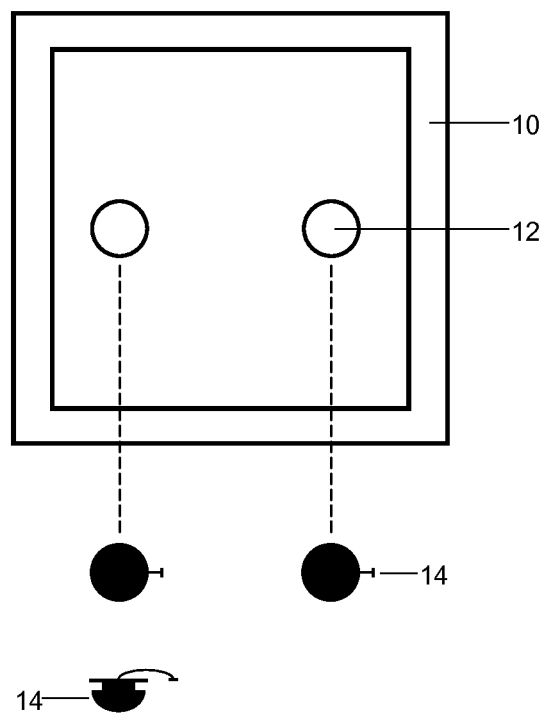
FIG. 2 illustrates a top view of the Remote Robotic Can Call system.

FIG. 2 illustrates a top view of the Remote Robotic Can Call system. A lid 10 which contains two vent holes 12. The vent holes 12 allow the odor of deer attractant to be emitted from the Remote Robotic Can Call system. Plugs 14 can be positioned in the vent holes 12 to prevent the emission of scent from the scent well 15. Two bags of scent can be positioned within the scent well 15 and positioned so that scent is allowed to be emitted from the scent well 15 via the scent holes 12.

Figure 3:
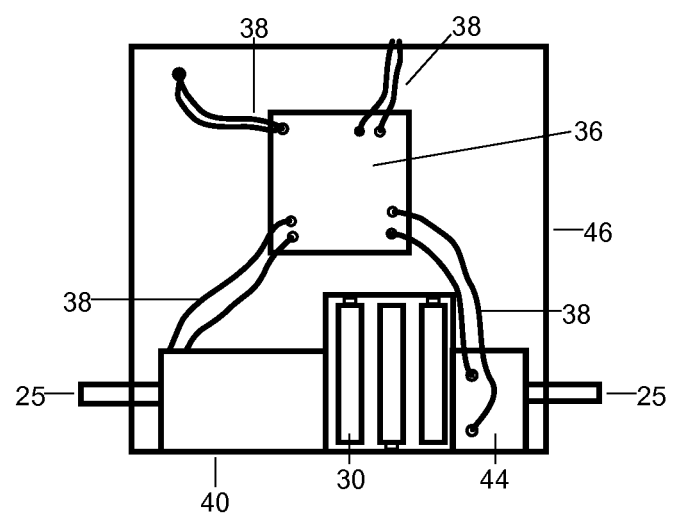
FIG. 3 is a side view of the internal, motorized compartment.
Figure 4:
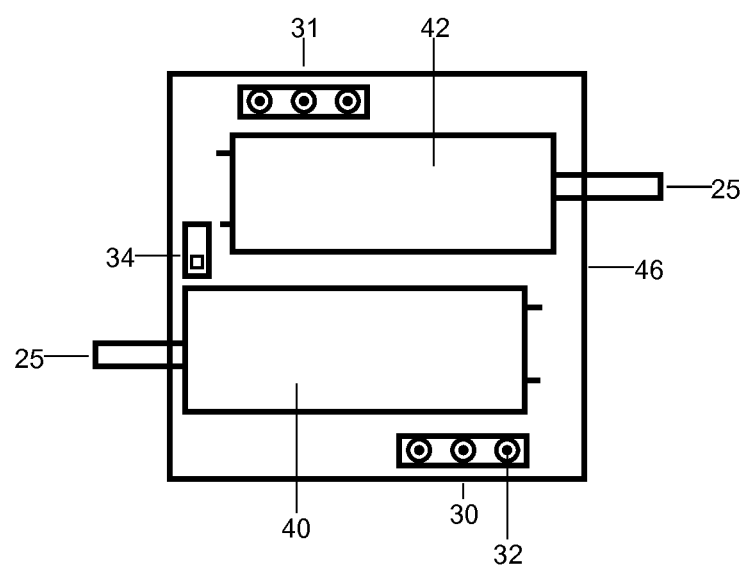
FIG. 4 illustrates a top view of the motorized compartment.

FIG. 3 illustrates a side view of the internal motorized compartment 30 of the Remote Robotic Can Call system. FIG. 4 illustrates a top view of the Remote Robotic Can Call system internal motorized compartment. The motorized compartment 30 of the present invention comprises two motors 40 and 42, two battery packs 31 and 32 that accept batteries to power the motors 40 and 42, wires 38 transmit the electric power from the battery packs 31 and 32 to the motors 40 and 42. The motor 40 powers at least one of the two arms 25 to pivot in a clockwise direction, which in turn, inverts a gripping arm attached thereto which inverts an attached deer can call. The motor 42 powers one of the two arms 25 to pivot in a clockwise direction, which in turn, inverts a gripping arm attached thereto which inverts a deer can call. Switch 34 can be turned to either an off or on position to turn the Remote Robotic Can Call system off or on, respectively. The Remote Robotic Can Call system can be operated with either one or two can calls attached. And, both commercially available or custom can calls can be utilized. Operation of the Remote Robotic Can Call system with two can calls allows the game/predator hunter to produce multiple calls simultaneously. So that the hunter could produce a call simulating a buck and a call simulating a doe.

Figure 5:
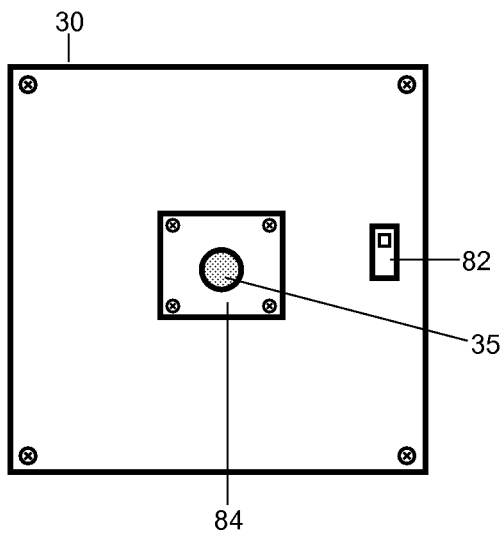
FIG. 5 illustrates a bottom view of the Remote Robotic Can Call system without any attachments.

FIG. 5 is a bottom view of the exterior of the Remote Robotic Can Call system without attachments. The exterior bottom of the motorized compartment 60 contains an on/off switch 82. The stake 35 is secured onto the bottom of the exterior can call body 60 via 84.

Figure 6:
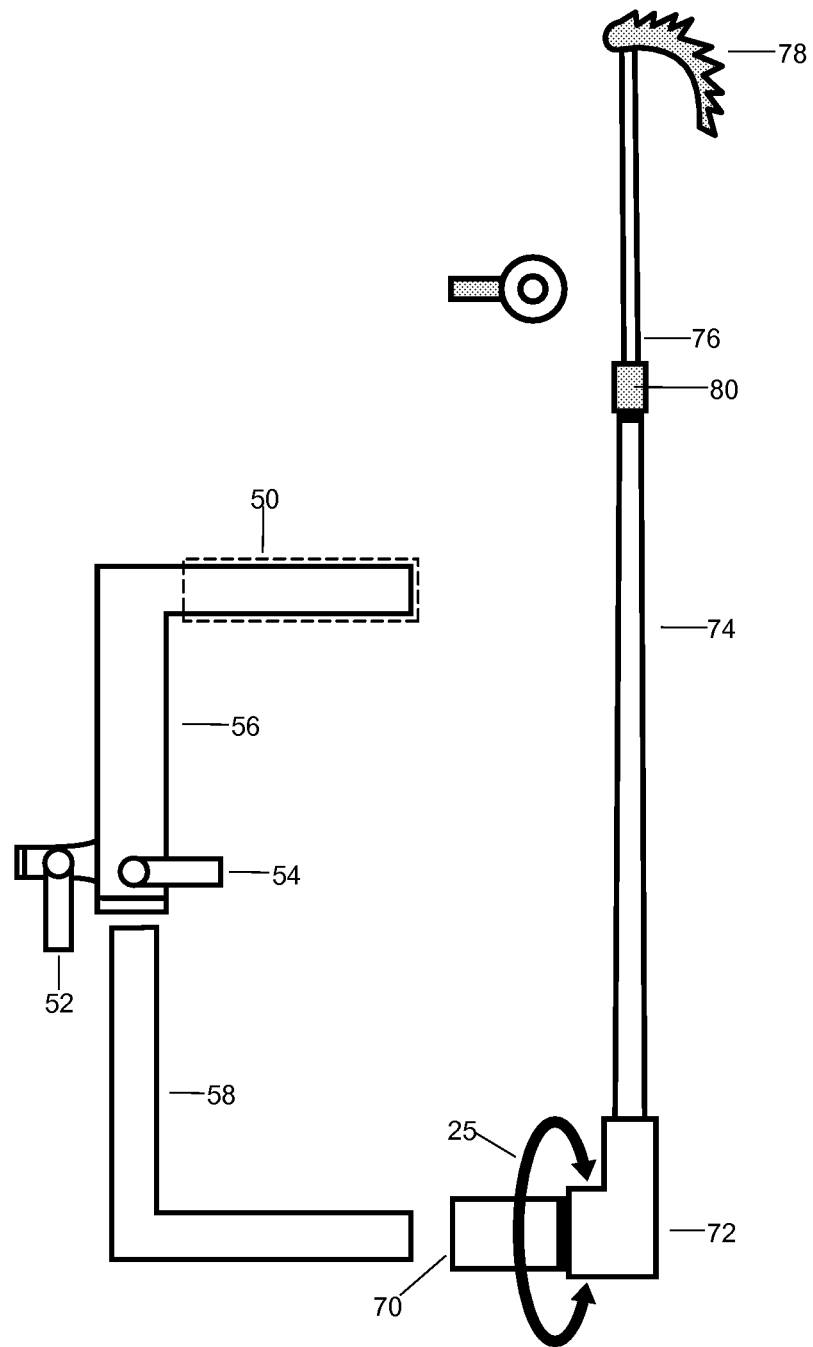
FIG. 6 illustrates a deer tail that can be attached to the gripping arm of the Remote Robotic Can Call system.

FIG. 6 illustrates the attachment of a deer tail decoy (70, 72, 74, 76, 78, and 80) to the gripping arm of the Remote Robotic Can Call system. The deer tail arm comprises a deer tail locking arm 70 that fits onto gripping arm 50 of the Remote Robotic Can Call system. The deer tail locking arm 70 fits into the deer tail pivot mechanism 72. When the gripping arm 50 is activated, the deer tail pivots about the deer tail pivot mechanism 72 causing the deer tail to rise and fall. The deer tail pivot mechanism 72 connects the deer tail arm 74 to the deer tail locking arm 70. The Deer tail arm 74 connects to the deer tail locking mechanism 80 which locks the deer tail adjustment arm 76 into position with the deer tail arm 74. The Deer tail locking mechanism allows the height of the deer tail to be adjusted. Deer tail 78 is lifted and raised upon activation of the Remote Robotic Can Call system to attract bucks to the desired area.

Figure 7:
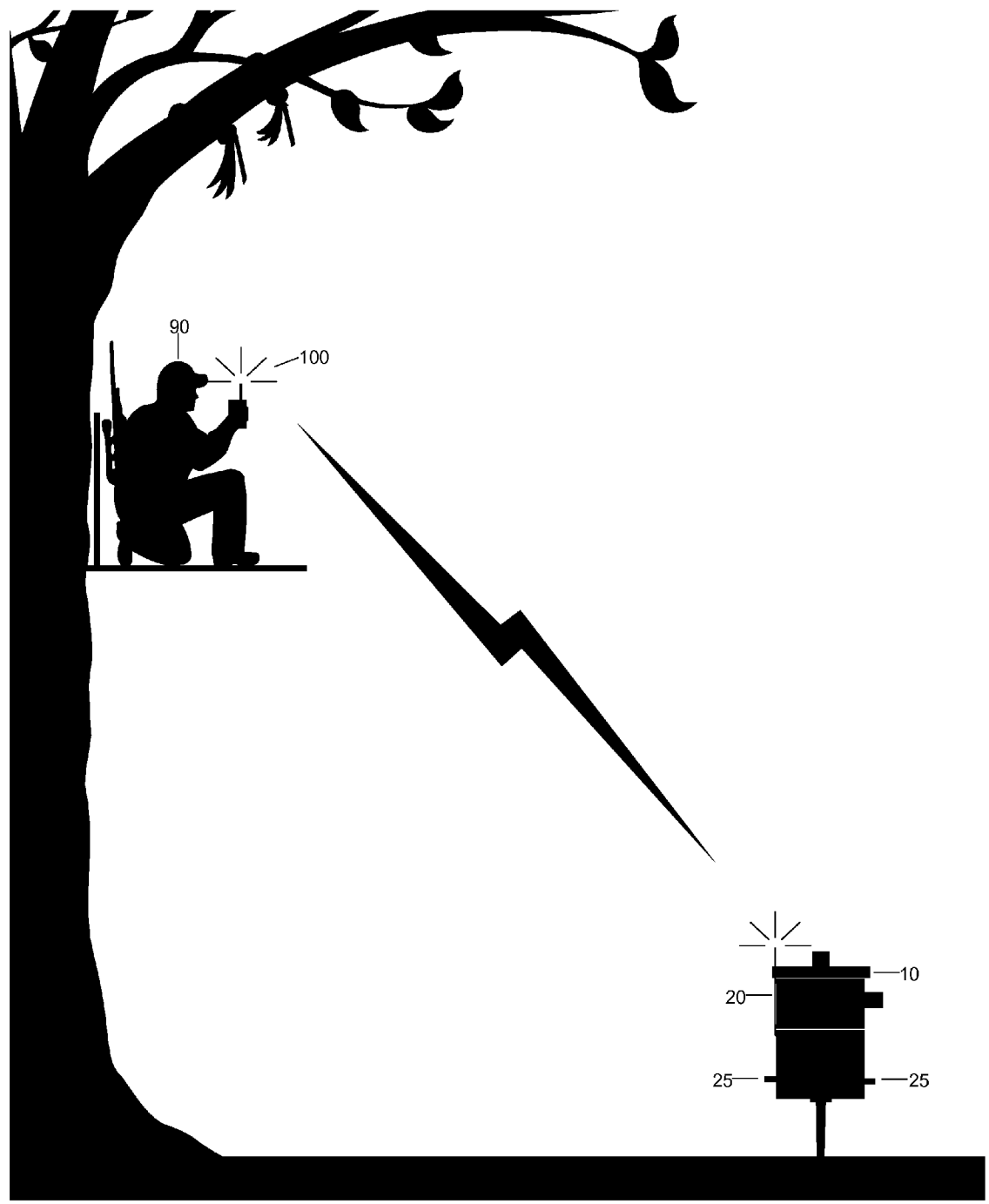
FIG. 7 illustrates a hunter activating the Remote Robotic Can Call system remotely from a tree stand.

FIG. 7 illustrates use of the Remote Robotic Can Call system by a hunter. Following attachment of at least one can call, the Remote Robotic Can Call system can be pushed into the ground via stake 2 and 4 into the desired location. Remote control 100 allows the deer hunter 90 to activate the Remote Robotic Can Call system and produce can deer calls from a remote location such as a tree stand positioned in a tree.

Having thus described our invention, and the manner of its use, it should be apparent to one of average skill in the arts that incidental changes may be made thereto that fairly fall within the scope of the following appended claims, wherein I claim:

1. A game call holder comprising:
   a housing disposing a motor and power source;
   said game call holder having a first shaft that extends from said housing and a second shaft that extends from another location of said housing,
   wherein said motor may be operated to independently rotate said first shaft when energized;
   wherein said motor may be operated to independently rotate said second shaft when energized;
   a power source for energizing said motor,
   a game call reversibly couples to said first shaft and second shaft; wherein said game call includes an internal mechanism that produces an animal noise when said game call is inverted, and wherein said game call lacks any member that engages another member to produce a game noise; and
   a remote control selectively activating said power source.

2. The game call holder of claim 1, wherein said housing is configured for mounting into the ground.

3. The game call holder of claim 1 wherein one game call is coupled to said game call holder.

4. The game call holder of claim 1 further comprising a gripping arm to reversibly attach said game call.

5. The game call holder of claim 1 wherein two game calls are coupled to said game call holder.

6. The game call of claim 1 wherein said game call is a cylindrical game call.

\* \* \* \* \*